(12) United States Patent
Suzuki

(10) Patent No.: US 9,667,531 B2
(45) Date of Patent: May 30, 2017

(54) IMAGE PROCESSING APPARATUS AND CONTROL METHOD

(71) Applicant: Masahiro Suzuki, Tokyo (JP)

(72) Inventor: Masahiro Suzuki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 278 days.

(21) Appl. No.: 14/340,875

(22) Filed: Jul. 25, 2014

(65) Prior Publication Data

US 2015/0032885 A1 Jan. 29, 2015

(30) Foreign Application Priority Data

Jul. 29, 2013 (JP) ................................. 2013-157084

(51) Int. Cl.
| | | |
|---|---|---|
| *G06F 15/173* | (2006.01) | |
| *H04L 12/707* | (2013.01) | |
| *G06F 17/30* | (2006.01) | |
| *H04L 12/725* | (2013.01) | |

(52) U.S. Cl.
CPC ........ *H04L 45/24* (2013.01); *G06F 17/30244* (2013.01); *H04L 45/306* (2013.01)

(58) Field of Classification Search
CPC ............................................. H04N 2201/0082
See application file for complete search history.

(56) References Cited

U.S. PATENT DOCUMENTS

| | | | | |
|---|---|---|---|---|
| 6,757,753 B1 * | 6/2004 | DeKoning | ............ | G06F 3/0605 710/36 |
| 2004/0027602 A1 * | 2/2004 | Kuboki | .............. | H04N 1/00002 358/1.13 |
| 2005/0172084 A1 * | 8/2005 | Jeddeloh | ............. | G06F 13/1642 711/154 |
| 2009/0067712 A1 * | 3/2009 | Oota | .................. | H04N 1/32561 382/167 |

(Continued)

FOREIGN PATENT DOCUMENTS

| | | |
|---|---|---|
| JP | 2000-069257 | 3/2000 |
| JP | 2000-296640 | 10/2000 |

(Continued)

OTHER PUBLICATIONS

'Veritas Storage Foundation 5.0 Dynamic Multi-pathing', Symantec Corporation, May 2007 [retrieved on Dec. 13, 2016]. Retrieved from the Internet: <URL:http://eval.symantec.com/mktginfo/enterprise/white_papers/ent-whitepaper_vsf_5.0_dynamic_multi-pathing_05-2007.en-us.pdf>.*

*Primary Examiner* — Kevin Bates
*Assistant Examiner* — Dae Kim
(74) *Attorney, Agent, or Firm* — Harness, Dickey & Pierce, P.L.C.

(57) ABSTRACT

An image processing apparatus includes: a storage unit that stores image data; a transfer-path determining unit that determines a transfer path via which the image data is to be transferred from among multiple transfer paths connected to the storage unit; a selection unit that selects the transfer path (Continued)

via which the image data is to be transferred based on the determined transfer path; and an access-request control unit that issues a next access request to the storage unit after waiting a response to an already-issued access request to the storage unit when the determined transfer path is changed from a transfer path used in most recent transfer of the image data.

10 Claims, 7 Drawing Sheets

(56) References Cited

U.S. PATENT DOCUMENTS

| | | | | |
|---|---|---|---|---|
| 2009/0287858 | A1* | 11/2009 | Kawahara | G06F 13/28 710/22 |
| 2011/0238941 | A1* | 9/2011 | Xu | G06F 13/1689 711/169 |
| 2012/0066449 | A1* | 3/2012 | Colgrove | G06F 3/061 711/114 |
| 2012/0089758 | A1* | 4/2012 | Yun | G06F 13/4022 710/110 |

FOREIGN PATENT DOCUMENTS

| | | |
|---|---|---|
| JP | 2001-127973 | 5/2001 |
| JP | 2004-046851 | 2/2004 |

* cited by examiner

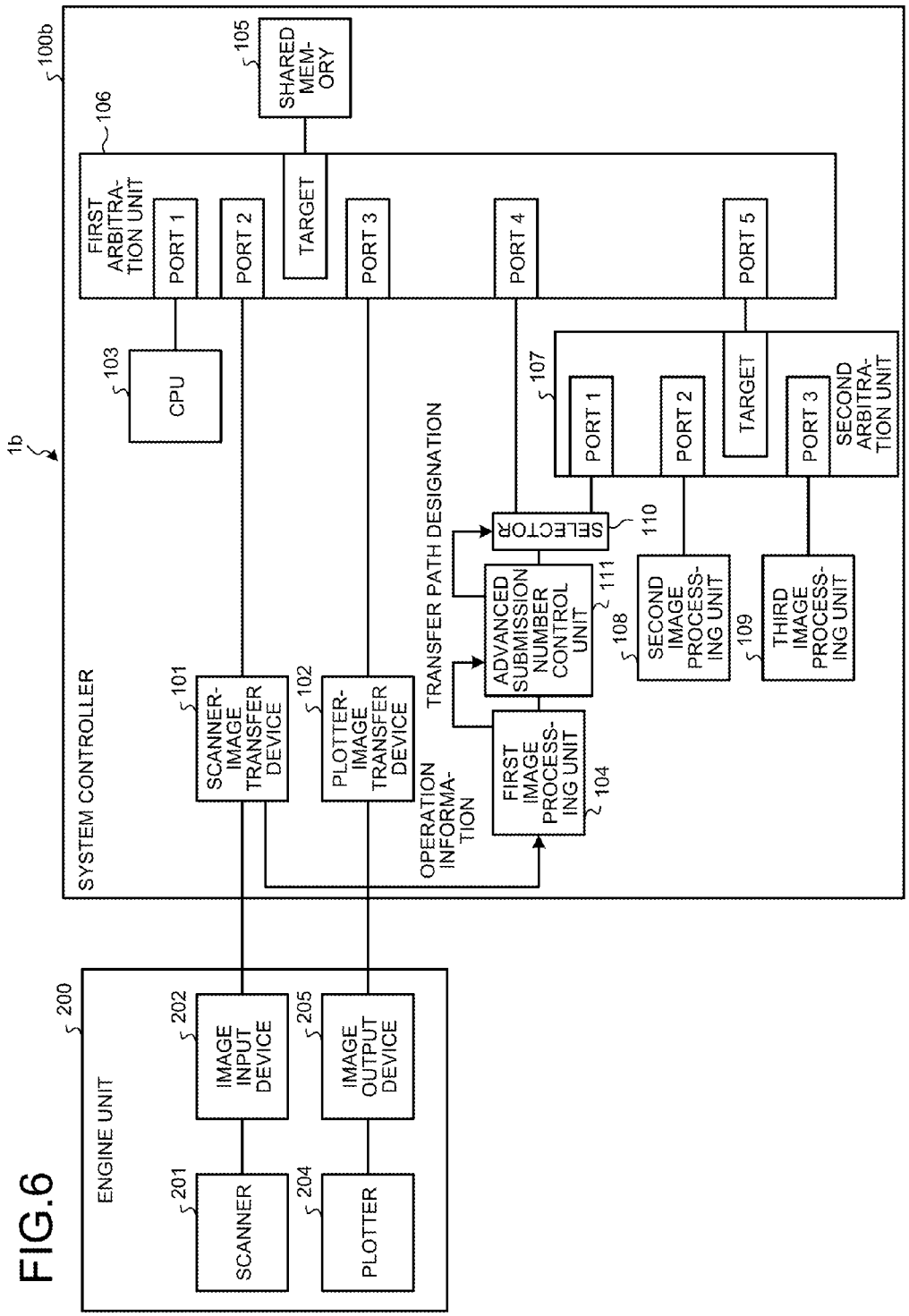

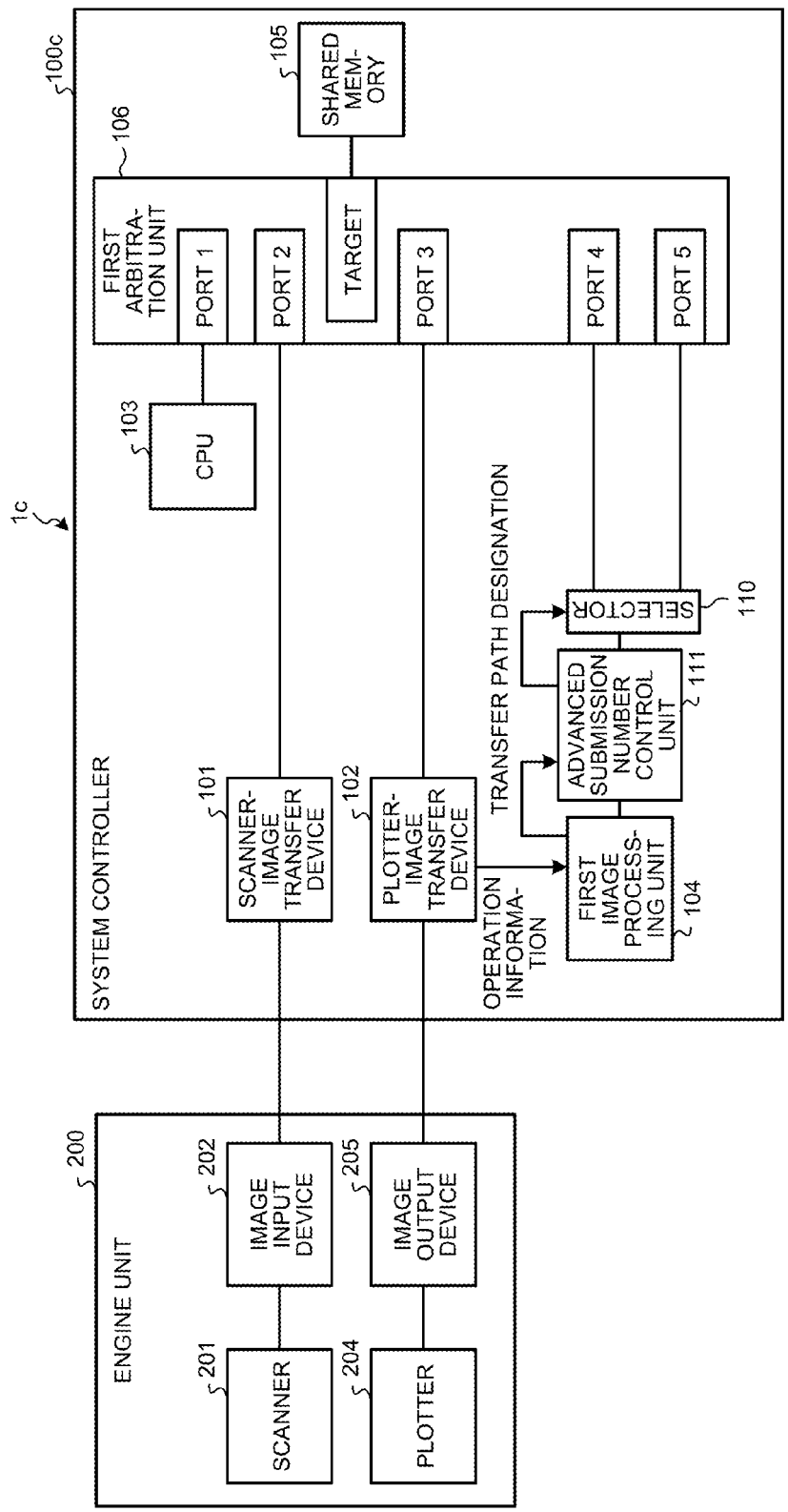

US 9,667,531 B2

IMAGE PROCESSING APPARATUS AND CONTROL METHOD

CROSS-REFERENCE TO RELATED APPLICATION(S)

The present application claims priority to and incorporates by reference the entire contents of Japanese Patent Application No. 2013-157084 filed in Japan on Jul. 29, 2013.

BACKGROUND OF THE INVENTION

1. Field of the Invention

The present invention relates to an image processing apparatus and a control method.

2. Description of the Related Art

A typical scanner reads an image at a fixed speed. Accordingly, in case the read image cannot be written to a shared memory at a fixed rate, a deficient image will be produced. A plotter image needs to be output line by line cyclically and delay of output leads to a deficient image. Therefore, for a shared memory to be accessed by multiple functions, an adjustment method of granting high priority levels to transfer of scanner images and plotter images is frequently adopted.

Meanwhile, in case an image temporarily stored in a memory is rotated and then output as a plotter image, if output is started after performing rotation processing on an image of one page, it is necessary to withhold start of the output until the rotation processing is completed, which disadvantageously decreases printing speed. Furthermore, it is necessary to reserve memory areas for two pages for rotation processing of one page: one page for an original image and one page for a rotated image. With respect thereto, Japanese Laid-open Patent Publication No. 2001-127973 discloses a method of starting output of an image at completion of rotation processing of several lines without waiting completion of rotation processing of one page.

When a first function is to be performed in cooperation with a second function that needs to guarantee a fixed image transfer rate in units of a line as described above, the first function is required to have a processing performance which allows the first function to perform fixed image processing line by line and keep pace with input of a scanner image or output of a plotter image. With respect thereto, there already exists a method that changes priority levels by issuing a memory access request to a port, to which a high bus-arbitration priority is given, only during when a function is performed in cooperation, but issuing a memory access request to a low priority port during when the function is performed without cooperation.

Meanwhile, there already exists a method for increasing bus transfer efficiency by using a so-called posted command issuance scheme of issuing commands one after another without waiting a response to each command, thereby increasing image processing speed, when distance to a shared memory is large and therefore a transfer rate become undesirably low according to a so-called non-posted command issuance scheme of issuing a next command after receiving read data (a response) to a read command or a completion notice (a response) to a write command. Japanese Laid-open Patent Publication No. 2004-046851 discloses a data transfer method using a multiplexed bus architecture which allows transferring an image via a path selected from multiple paths. This method can provide effects of increasing transfer bandwidth by multiplexing transfer path, allowing efficient selection from the multiplexed transfer paths, and preventing an order of memory writes from being changed from an order of memory write requests due to the memory write requests issued by multiple masters passing through different paths.

However, when multiple requests are submitted in advance without waiting a response to a memory access request, the requests are transferred via different data paths from different ports. Therefore, there can occur a situation where a first memory access request that is issued later than a second memory access request by a function being a master reaches a memory earlier than the second memory access request, leads to production of a deficient image resulting from data overwriting in the memory in the case of write, or, error in an order of response data in the case of read.

Under the circumstances described above, there is a need to provide image forming apparatuses capable of, even with a bus architecture having multiple access paths to a memory, maintaining an order of accesses to the memory caused by memory access requests issued by a single master and an order of responses to the requests.

SUMMARY OF THE INVENTION

It is an object of the present invention to at least partially solve the problems in the conventional technology.

An image processing apparatus includes: a storage unit that stores image data; a transfer-path determining unit that determines a transfer path via which the image data is to be transferred from among multiple transfer paths connected to the storage unit; a selection unit that selects the transfer path via which the image data is to be transferred based on the determined transfer path; and an access-request control unit that issues a next access request to the storage unit after waiting a response to an already-issued access request to the storage unit when the determined transfer path is changed from a transfer path used in most recent transfer of the image data.

A control method includes: determining a transfer path via which image data is to be transferred from among multiple transfer paths connected to a storage unit that stores the image data; selecting the transfer path via which the image data is to be transferred based on the determined transfer path; and issuing a next access request to the storage unit after waiting a response to an already-issued access request to the storage unit when the determined transfer path is changed from a transfer path used most recently.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a block diagram illustrating a functional configuration of an image processing apparatus according to a third embodiment; and FIG. 7 is a block diagram illustrating a functional configuration of an image processing apparatus according to a fourth embodiment.

DETAILED DESCRIPTION OF THE PREFERRED EMBODIMENTS

Exemplary embodiments of the present invention are described below with reference to the accompanying drawings.

First Embodiment

Figure 1:
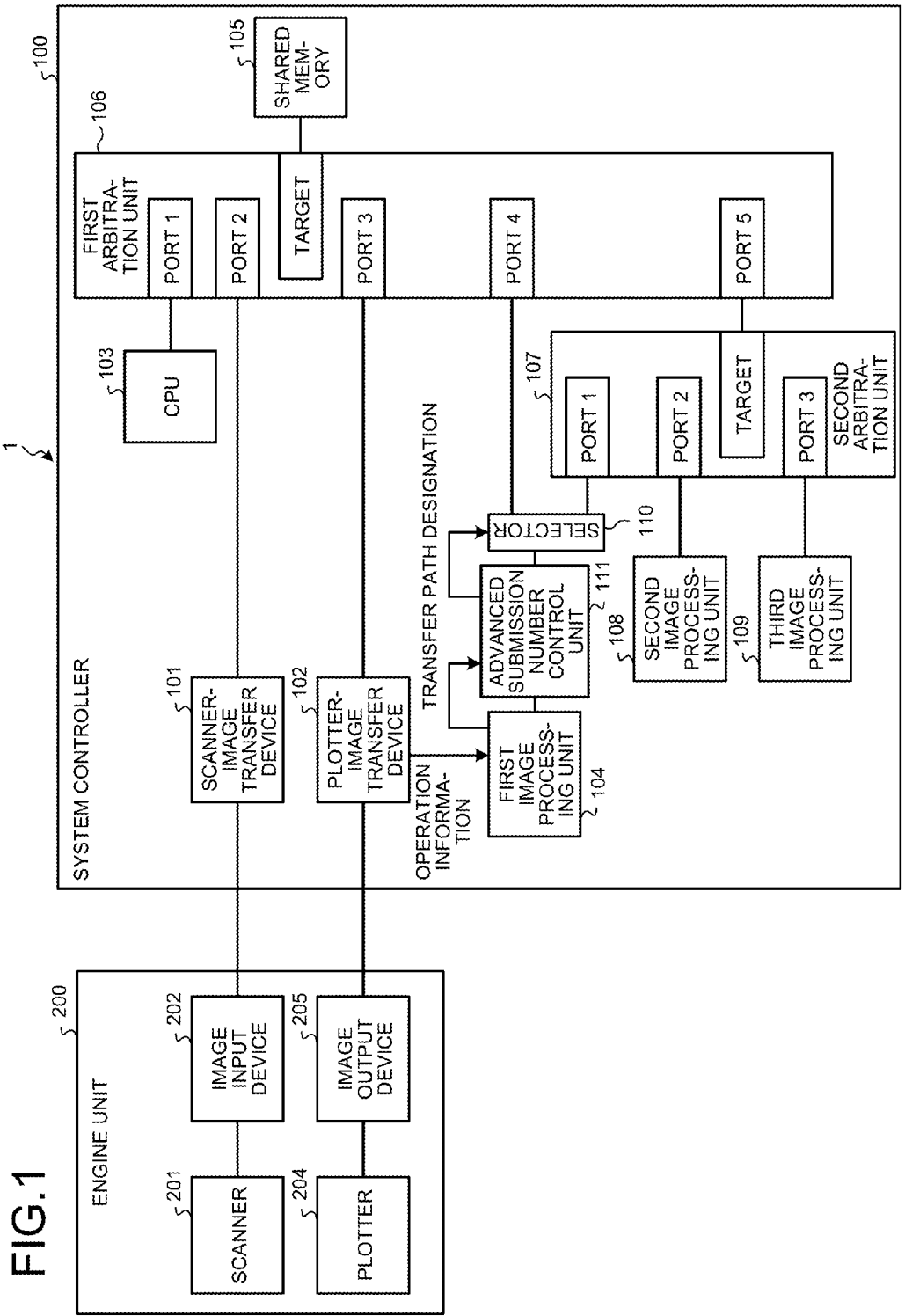
FIG. 1 is a block diagram illustrating a functional configuration of an image processing apparatus according to a first embodiment.

FIG. 1 is a schematic diagram of an image processing apparatus 1 according to a first embodiment of the present invention. Referring to FIG. 1, the image processing apparatus 1 includes an engine unit 200 and a system controller 100. The system controller 100 includes a shared memory 105, a first arbitration unit 106, a scanner-image transfer device 101, a plotter-image transfer device 102, a central processing unit (CPU) 103, a first image processing unit 104, a second image processing unit 108, and a third image processing unit 109. The engine unit 200 includes a scanner 201, an image input device 202, a plotter 204, and an image output device 205. The image processing apparatus 1 is configured such that image data obtained by scanning in the engine unit 200 is input to the system controller 100, and the system controller 100 controls data writing to the shared memory (storage unit) 105. Original document data read by the scanner 201 is transferred to the system controller 100, and output data obtained by the system controller 100 performing image processing on the original document data is printed by the plotter 204 on paper.

The image input device 202 transfers an original document image read by the scanner 201 to the system controller 100. The image output device 205 receives an output image transferred from the plotter-image transfer device 102 of the system controller 100 and transfers the output image to the plotter 204.

The first arbitration unit 106 controls accesses to the shared memory 105. The scanner-image transfer device 101, the plotter-image transfer device 102, the CPU 103, the first image processing unit 104, the second image processing unit 108, the third image processing unit 109, and the like correspond to masters and access the shared memory 105. The scanner-image transfer device 101 controls receiving an image read by the engine unit 200 and writing the image to the shared memory 105. The plotter-image transfer device 102 controls reading out an image to be output temporarily stored in the shared memory 105 and transferring the print image to the engine unit 200.

The CPU 103 performs operations including setting of operating modes and start up instruction to devices including the scanner-image transfer device 101 and the first arbitration unit 106, and address management for the shared memory 105. The image processing apparatus 1 may include more than one first image processing unit 104 each having a function such as an image compressing/expanding function, an image rotating function, an image encrypting function, an image processing function, or the like. To operate in cooperation with the plotter-image transfer device 102, it is necessary for the first image processing unit 104 to process an image while keeping pace with a transfer rate of the plotter-image transfer device 102. For this purpose, the first image processing unit 104 includes a data path for increasing memory access rate only during cooperation. A selector 110 selects a transfer path to be used from multiple transfer paths. The first image processing unit 104 receives an operation information signal indicating whether or not the plotter-image transfer device 102 is operating, determines whether or not the plotter-image transfer device 102 is in cooperation based on a parameter set by the CPU 103, and transmits a transfer-path designation signal to the selector 110.

The image processing apparatus 1 may include more than one second image processing unit 108 and more than one third image processing unit 109 each having a function such as an image compressing/expanding function, an image rotating function, an image encrypting function, or an image processing function. The shared memory 105 is a main storage unit which temporarily stores an image and/or a program for the CPU 103. The image data input to the scanner-image transfer device 101 is temporarily loaded into the shared memory 105.

The first arbitration unit 106 is a data bus which controls an order of accesses to be made from masters to the shared memory 105, and performs arbitration regarding priority levels so that the shared memory 105 can be utilized efficiently. A second arbitration unit 107 is a data bus which controls an order of access requests issued to a port 5 of the first arbitration unit 106, and performs arbitration regarding priority levels so that the shared memory 105 can be utilized efficiently.

The selector 110 selects any one of the first arbitration unit 106 and the second arbitration unit 107 as a connection destination according to the transfer-path designation signal fed from an advanced submission number control unit 111. A system including more than one first image processing unit 104 will include the same number of the selectors 110 as the first image processing units 104. The advanced submission number control unit 111 (access-request control unit) controls the number of memory access requests to be submitted in advance without waiting a response to an already-issued memory access request (read command/write command). The advanced submission number control unit 111 determines whether responses to already-issued memory access requests are returned by counting the number of transferred memory access requests and the number of responses thereto and monitoring the difference between the numbers. When the transfer-path designation signal indicates that a transfer path to the shared memory 105 be switched, the advanced submission number control unit 111 performs control so as to withhold issuance of a next request until response to every request (command) issued prior to path switching is received. More specifically, when instructing the selector 110 to switch a transfer path, the advanced submission number control unit 111 causes the transfer path to be switched after response to every request (command) is received and before issuance of a next request.

The second image processing unit 108 and the third image processing unit 109 are lower in memory access priority than the first image processing unit 104 and connected to the port 5 of the first arbitration unit 106 after undergoing arbitration provided by the second arbitration unit 107. The first image processing unit 104 transfers data via a higher priority port 4 of the first arbitration unit 106 only when operating in cooperation with the plotter-image transfer device 102. The first image processing unit 104 undergoes arbitration provided by the first arbitration unit 106 after undergoing arbitration provided by the second arbitration unit 107 when operating independent of the plotter-image transfer device 102.

Accordingly, access to the shared memory 105 can be made in shorter response time via the port 4 than access via the port 5 intermediated with the second arbitration unit 107. In the case of passing through the second arbitration unit 107, the access undergoes arbitration between other masters connected to the second arbitration unit 107 and thus the percentage at which the access is granted decreases, which also leads to decrease in memory access rate. When functions with low priority levels are localized to the second arbitration unit 107, a configuration in which the priority level of the port 5 is set to be lower than priority levels of ports 1 to 5 of the first arbitration unit 106 may be employed.

The first image processing unit 104 determines whether it receives, from the plotter-image transfer device 102, operation information indicating that an image is being transferred and the first image processing unit 104 is operating in cooperation with the plotter-image transfer device 102. The first image processing unit 104 then outputs to the selector 110 transfer-path designation information instructing whether a memory access request be directly transferred to the first arbitration unit 106 or be transferred via the second arbitration unit 107. Image data read by the scanner 201 of the engine unit 200 is temporarily stored in the shared memory 105 via the scanner-image transfer device 101. The image data is converted into a form capable of being output, through image processing by the first image processing unit 104 and output to the plotter 204 of the engine unit 200 via the plotter-image transfer device 102. Image processing to be performed by the image processing units 104, 108, and 109 may be the image rotating function or the compressing/expanding function. Although not shown, a hard disk drive (HDD) controller and/or a network interface (I/F) may be provided.

Figure 2:
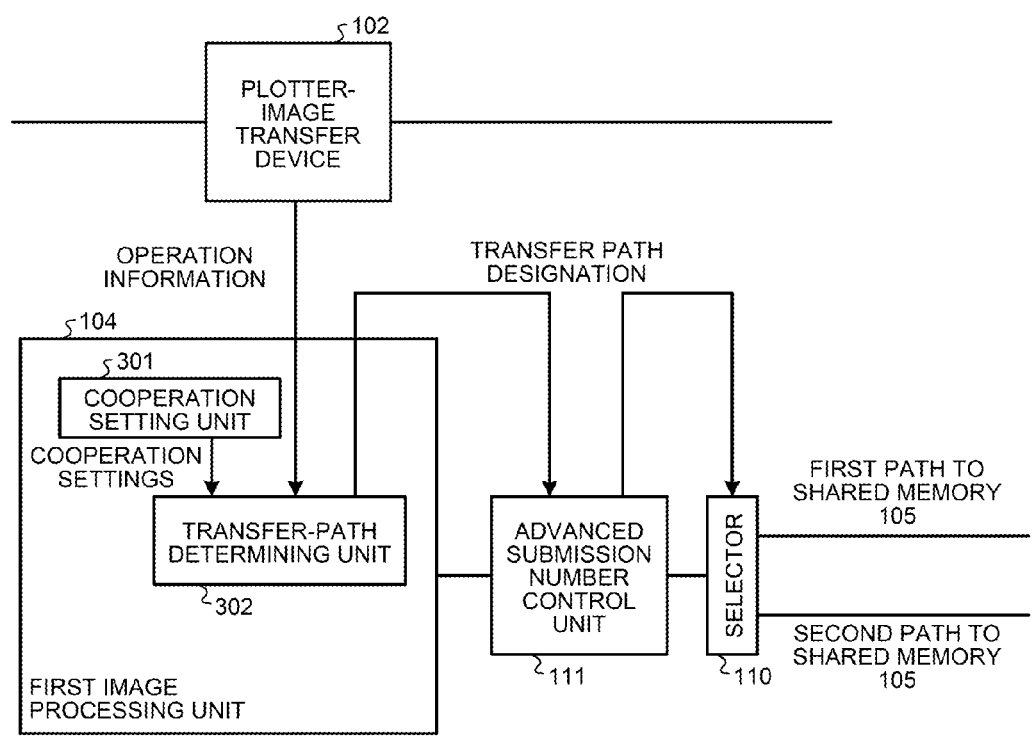
FIG. 2 is a diagram illustrating a detailed functional configuration of a first image processing unit according to the first embodiment.

FIG. 2 is a block diagram illustrating the configuration of FIG. 1 in more detail. The first image processing unit 104 further includes a cooperation setting unit 301 and a transfer-path determining unit 302. The cooperation setting unit 301 holds instruction content as to whether operation in cooperation is performed or independent operation of a function is performed, instructed by a parameter specified by the CPU 103. Operation in cooperation denotes control for reducing memory capacity and processing time by, in advance of when one page of a scanner image is stored in a memory, starting image processing (e.g., rotation or compression) to be performed next while controlling the image processing so as not to be done earlier than input of the scanner image. Operation in cooperation may alternatively denote control for increasing productivity of a multifunction peripheral (MFP) without enlarging a memory capacity by sequentially writing an image of a next page to a memory area, data stored in which has already been output, so that the writing is not performed to an area, data stored in which is not yet output.

The transfer-path determining unit 302 determines a transfer path based on the cooperation settings held by the cooperation setting unit 301 and the operation information fed from the plotter-image transfer device 102, and provides transfer path designation to the advanced submission number control unit 111. When a transfer path to the shared memory 105 is to be switched according to the transfer path designation, the advanced submission number control unit 111 withholds request issuance to the selector 110 so that a next memory access request via a transfer path different from that of an immediately-preceding memory access is issued after receipt of a response to an already-issued memory access request (read command/write command).

Figure 3:
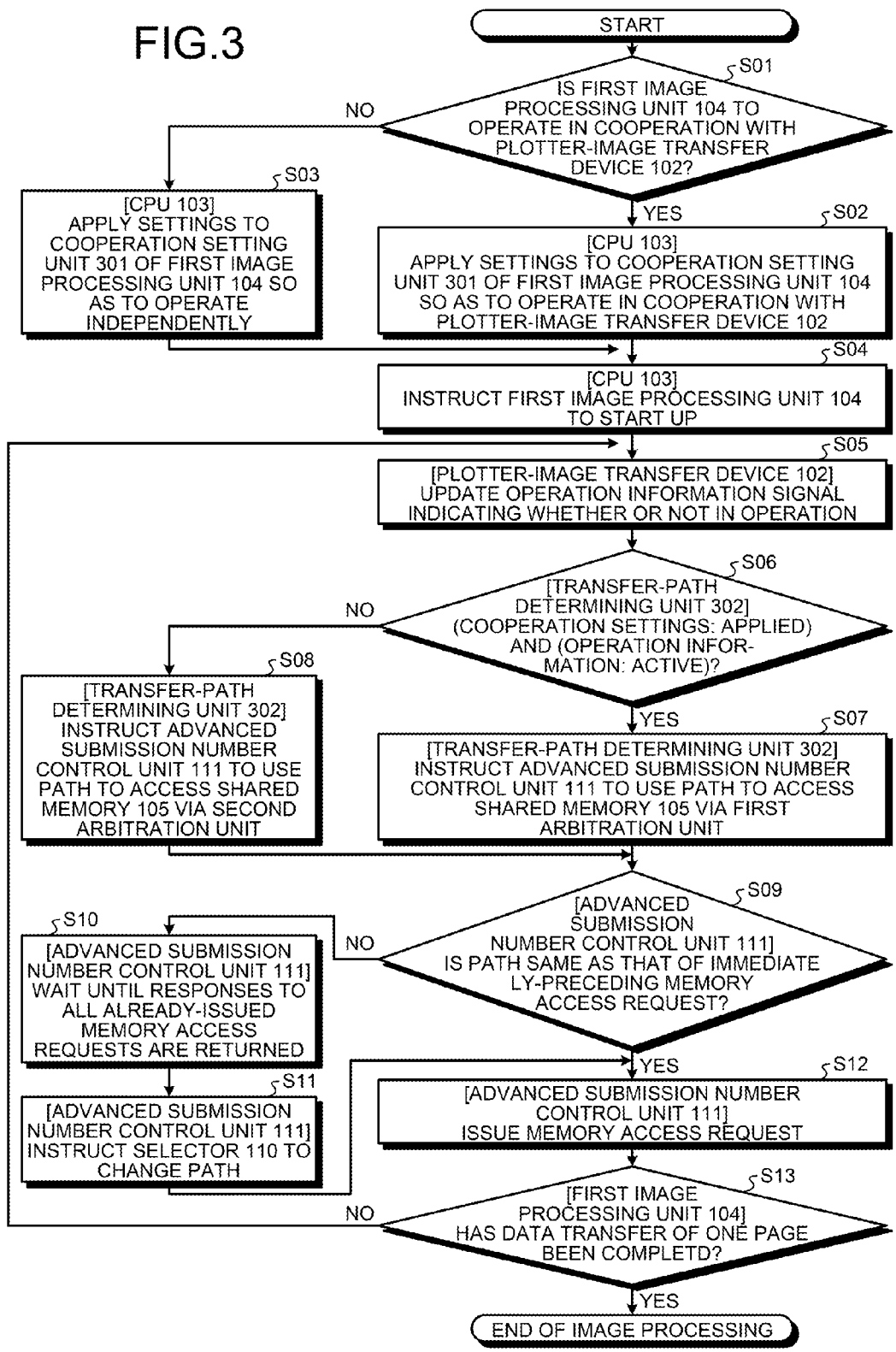
FIG. 3 is a flowchart illustrating a procedure for selecting an image transfer path according to the first embodiment.

FIG. 3 is a flowchart illustrating a procedure for image transfer control. As illustrated in FIG. 3, whether or not the first image processing unit 104 is to operate in cooperation with the plotter-image transfer device 102 is determined first (Step S01). If it is determined that the first image processing unit 104 is to operate in cooperation (Yes in Step S01), the CPU 103 performs settings for operation in cooperation with the plotter-image transfer device 102 on the cooperation setting unit 301 (Step S02). In this case, an image processing speed of the first image processing unit 104 needs to keep pace with a plotter-image transfer rate, and thus it is necessary to increase a memory-access priority level of the first image processing unit 104. During when the plotter-image transfer device 102 is operating (i.e., operating in cooperation), the settings of Step S02 are performed to change a transfer path so that a memory access request of the first image processing unit 104 is processed with a high priority.

On the other hand, if it is determined that the first image processing unit 104 is not to operate in cooperation (No in Step S01), the CPU 103 performs settings for independent operation on the cooperation setting unit 301 (Step S03). Subsequently, the CPU 103 instructs the first image processing unit 104 to start up (Step S04). The plotter-image transfer device 102 updates an operation information signal in real time (Step S05). More specifically, the operation information signal goes High when the plotter-image transfer device 102 is active but goes Low when the plotter-image transfer device 102 completes operation, and the real-time controlled operation information signal is updated immediately before the signal is referred to by the transfer-path determining unit 302.

The transfer-path determining unit 302 checks whether the settings of the cooperation setting unit 301 indicate that operation be performed in cooperation with the plotter-image transfer device 102 and checks the operation information signal fed from the plotter-image transfer device 102, thereby determining whether an instruction to operate in cooperation is given and the operation information is High (i.e., the plotter-image transfer device 102 is active) (Step S06). If it is determined that an instruction to operate in cooperation is given and the operation information is High (Yes in Step S06), the transfer-path determining unit 302 instructs the advanced submission number control unit 111 to use a path directly connected to the first arbitration unit 106 by sending a transfer-path designation signal (Step S07). On the other hand, if it is determined that an instruction to operate independently is given or if the operation information is Low (No in Step S06), the transfer-path determining unit 302 instructs the advanced submission number control unit 111 to use a path connected to the shared memory 105 via the second arbitration unit 107 by sending a transfer-path designation signal (Step S08).

Subsequently, the advanced submission number control unit 111 determines a path according to the transfer-path designation signal. More specifically, the advanced submission number control unit 111 determines a path via which an immediately-preceding memory access request has been issued from among the paths, and determines whether or not the path of the immediately-preceding memory access request is the same as the designated path (Step S09). If the designated path differs from the transfer path of the immediately-preceding memory access request (No in Step S09), the advanced submission number control unit 111 withholds issuance of a next memory access request until response to every already-issued memory access request is received (Step S10). After response to the every already-issued memory access request is received, the advanced submission number control unit 111 instructs the selector 110 to change a path (Step S11). The reason why the transfer-path designation signal is temporarily held by the advanced submission number control unit 111 before the signal is input to the selector 110 is to wait for read/write response to return via the transfer path of the already-issued request(s). In a configuration where a response path and a request issuance path are separated, it is no problem to update the transfer-path designation signal immediately when the transfer-path designation signal is fed from the transfer-path determining unit 302.

If the designated path is the same as the transfer path of the immediately-preceding memory access request (Yes in Step S09), Steps S10 and S11 are skipped, and the advanced submission number control unit 111 issues a memory access request via the designated transfer path (Step S12). The sequence of Steps S05 through Step S11 is repeated each time a memory access request is issued until one page of data has been transferred (Yes in Step S13). When the one page data has been transferred, the first image processing unit 104 notifies the CPU 103 of completion of the image processing using completion interrupt or the like.

The image processing apparatus 1 according to the first embodiment described above is configured to, when a memory access request is to be issued via a transfer path different from a transfer path of an immediately-preceding memory access request, withholds issuance of the next memory access request until it is determined that the immediately-preceding memory access request has been completed. This configuration can ensure that an order of a first memory access and a second memory access, which is issued next to the first memory access, remains unchanged. Accordingly, even with a bus architecture having multiple access paths to a memory, accesses to the memory at memory access requests issued by a single master can be made with keeping an order of the accesses and an order of responses to the requests unchanged.

Furthermore, high priority access to the shared memory 105 is allowed only when the first image processing unit 104 operates in cooperation with the plotter 204, and the priority level of the access is lowered before and after image output of the plotter 204. Memory access is controlled in this manner which does not grant high priority too frequently as compared with those of other masters. Accordingly, memory access in the system can be optimized in a range causing a deficient image not to occur.

Second Embodiment

Figure 4:
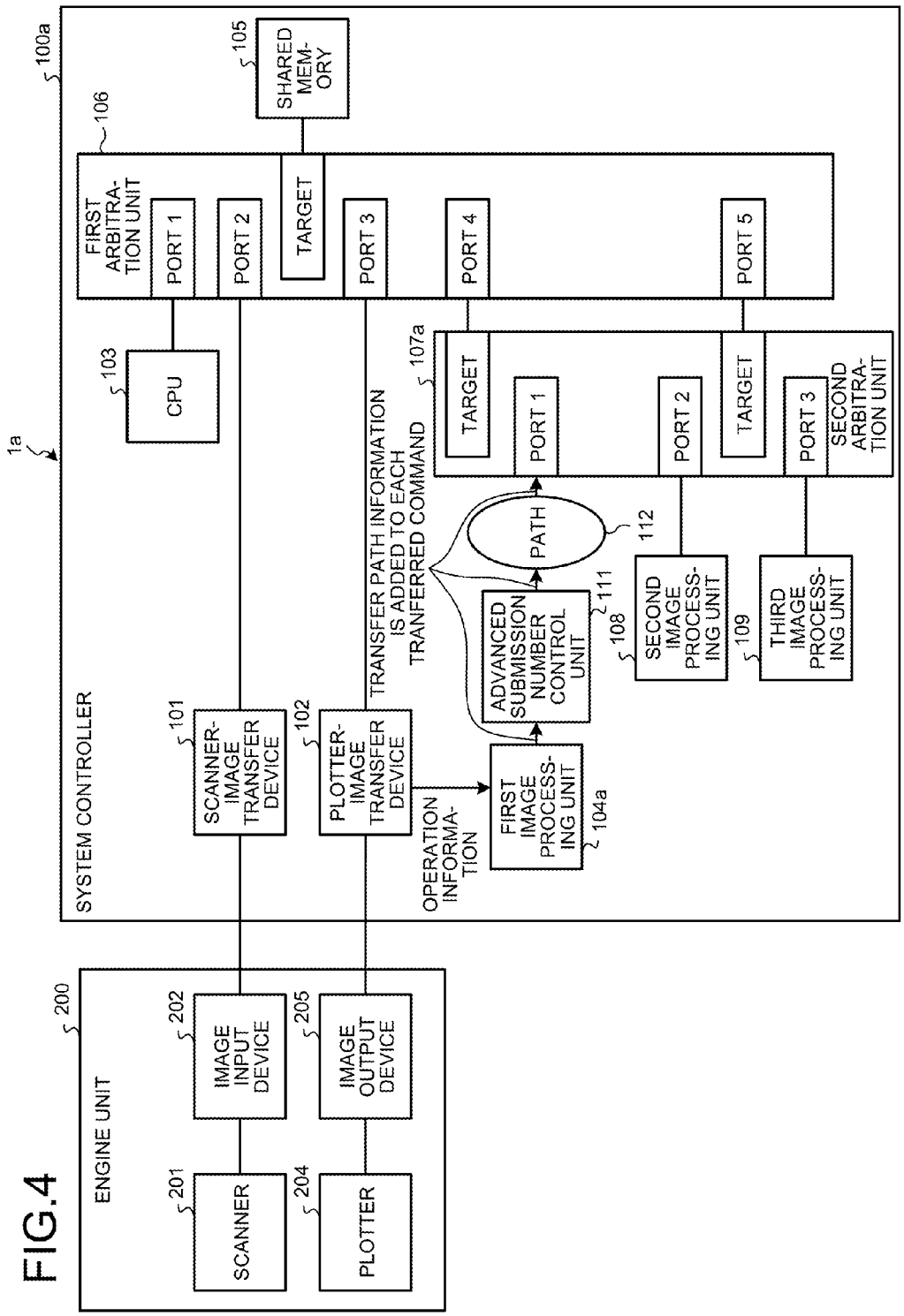
FIG. 4 is a block diagram illustrating a functional configuration of an image processing apparatus according to a second embodiment.

An information processing apparatus 1a according to a second embodiment of the present invention is described below with reference to FIG. 4. Note that description about elements of the second embodiment similar to those of the first embodiment is omitted. A system controller 100a, which differs from the system controller 100 of the first embodiment, will be mainly described below. In contrast to the first embodiment where changing a transfer path is performed by the selector 110, in the second embodiment, changing a transfer path is performed by a second arbitration unit 107a.

In a situation where changing a transfer path is implemented in a function which is directly uncontrollable by a first image processing unit 104a or a situation where another arbitration unit or another image processing function is interposed, control may be performed as follows. Transfer path designation is not directly sent, but added as an attribute to a memory access request (i.e., command) on a path 112, and the second arbitration unit 107a that is to receive the request controls which one of transfer paths is to be used in transferring the request to the shared memory 105. The function of the advanced submission number control unit 111 in the selector-less configuration of the second embodiment remains the same as that of the first embodiment, and refers to the transfer-path information added to the memory access request and performs control to issue a memory access request to be issued immediately after a transfer path is changed after response to every already-issued memory access request is received.

A priority level higher than that of the port 5 of the first arbitration unit 106 is assigned to the port 4. Attribute information is added to a memory access request so as to cause the first image processing unit 104a to access the shared memory 105 via the port 4 during when the first image processing unit 104a is operating in cooperation with the plotter-image transfer device 102 but, during when the first image processing unit 104a is operating independently, the first image processing unit 104a accesses the shared memory 105 via the port 5 with the lower priority level.

Figure 5:
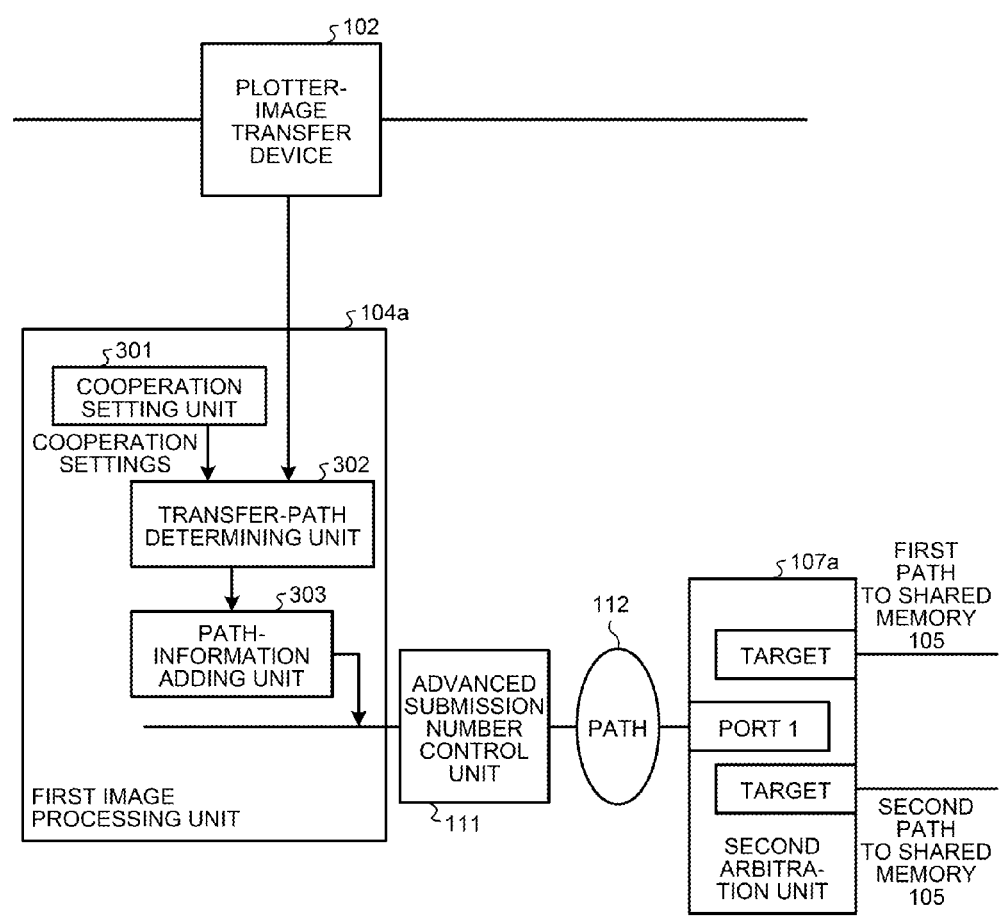
FIG. 5 is a diagram illustrating a detailed functional configuration of a first image processing unit according to the second embodiment.

FIG. 5 is a diagram illustrating a detailed configuration of the first image processing unit 104a. Referring to FIG. 5, the first image processing unit 104a additionally includes a path-information adding unit 303. The cooperation setting unit 301 has a function similar to that of the first embodiment. The transfer-path determining unit 302 has a function similar to that of the first embodiment but transmits a transfer-path designation signal to the path-information adding unit 303 rather than to the advanced submission number control unit 111. The path-information adding unit 303 adds transfer-path designation information to a memory access request issued by the first image processing unit 104a.

The advanced submission number control unit 111 performs control as in the first embodiment according to the transfer path information added to the memory access request. The second arbitration unit 107a allocates a transfer path to the memory access request to the shared memory 105 based on the transfer path information added to the request.

The configuration according to the second embodiment allows, even with a selector-less configuration or even when designation of a transfer path cannot be directly provided to a selector, data transfer can be performed appropriately based on transfer path information.

Third Embodiment

An information processing apparatus 1b according to a third embodiment of the present invention is described below with reference to FIG. 6. Note that description about elements of the third embodiment similar to those of the first embodiment is omitted. A system controller 100b, which differs from the system controller 100 of the first embodiment, will be mainly described below. In the first embodiment, an access path to the shared memory 105 is changed when operation is to be performed in cooperation with the plotter-image transfer device 102. The third embodiment differs from the first embodiment in that an access path to the shared memory 105 is changed when a function is to be performed in cooperation with the scanner-image transfer device 101. Control is performed in such a manner that, before a scanner image is written to the shared memory 105, an image being written to the shared memory 105 is processed by the first image processing unit 104 in parallel and in cooperation with the scanner-image transfer device 101. Each of the first image processing unit 104, the advanced submission number control unit 111, and the selector 110 has a function similar to that of the first embodiment. Meanwhile, the operation in cooperation with a scanner image may be implemented using a configuration similar to that of the second embodiment.

That is, the first image processing unit 104 is controlled to perform processing on a scanner image which is being written to the shared memory 105 in parallel and in cooperation with the scanner-image transfer device 101 before the scanner image is written to the shared memory 105. As a result, processing time regarding the scanner can be reduced. Furthermore, according to this control, it is not necessary to load an image of one page fed from the scanner into the shared memory 105. Accordingly, it becomes possible to reduce a memory area by, for example, configuring a scanner-image write area with a ring buffer or overwriting a scanner image portion before image processing with an image processed by the first image processing unit 104.

Fourth Embodiment

A system controller 100c of an information processing apparatus 1c according to a fourth embodiment of the present invention is described below with reference to FIG. 7. In the fourth embodiment, the port 4 and the port 5 of the first arbitration unit 106 are connected to the selector 110 which changes a transfer path. A memory access priority higher than that of the port 5 of the first arbitration unit 106 is assigned to the port 4. The first arbitration unit 106 includes data buffers and command (request) buffers at ports of respective masters and can receive and buffer one or more commands.

As illustrated in FIG. 7, when a transfer path is changed from the higher priority port 4 to the lower priority port 5, a first memory access request via the port 5 cannot be prioritized relative to a second memory access request via the port 4 issued earlier than the first memory access request by the advanced submission number control unit 111. In short, the second memory access request via the port 4 reaches the shared memory 105 invariably earlier than the first memory access request. If the selector 110 is configured to select paths only for memory access requests and to transfer every response data to the first image processing unit 104 irrespective of a path via which the response data is returned, even when a transfer path is changed, the advanced submission number control unit 111 can successively issue a memory access request via the changed transfer path without need to wait response to every already-issued memory access request.

Meanwhile, in a situation where a transfer path is changed from the lower priority port 5 to the higher priority port 4 in accordance with transfer path designation, and data and requests are stored in the data buffer and the command buffer of the first arbitration unit 106, a situation can occur where a first memory access request accessed via the higher priority port 4 is prioritized relative to a second memory access request issued earlier than the first memory access request via the lower priority port 5. To prevent occurrence of such an undesirable situation, the advanced submission number control unit 111 is configured to issue a next memory access request after waiting a response to an already-issued memory access request when transfer path designation is changed from a lower priority path to a higher priority path.

Thus, in the present embodiment, in the configuration in which multiple access paths are provided and it is guaranteed that a first memory access request issued via a higher priority path is issued later than but is prioritized relative to a second memory access request issued via a lower priority path, the advanced submission number control unit 111 performs control of issuing a next memory access request after waiting a response to an already-issued memory access request only when change is made from a lower priority path to a higher priority path.

An image processing apparatus according to an embodiment of the present invention includes a control device such as a CPU, a storage device such as a read only memory (ROM) and a random access memory (RAM), an external storage device such as an HDD or a compact disk (CD) drive, a display device, and an input device such as a keyboard and a mouse. Thus, the image processing apparatus has a typical-computer-based hardware configuration.

Program instructions to be executed by an image processing apparatus according to an embodiment may be provided as being recorded in a non-transitory computer-readable recording medium such as a CD-ROM, a flexible disk (FD), a CD recordable (CD-R), or a digital versatile disk (DVD) as an installable or executable file.

Program instructions to be executed by an image processing apparatus according to an embodiment may be configured to be stored in a computer connected to a network such as the Internet and provided by being downloaded into the image processing apparatus over the network. Program instructions to be executed by an image processing apparatus according to an embodiment may be configured to be provided or distributed over a network such as the Internet.

Program instructions to be executed by an image processing apparatus according to an embodiment may be configured to be provided as being stored in a ROM or the like in advance.

Program instructions to be executed by an image processing apparatus according to an embodiment are configured in modules including the units described above. From the viewpoint of actual hardware, the CPU (processor) reads out the program instructions from the storage medium and executes the program instructions to load the units into the main storage device, thereby generating the units on the main storage device.

In the embodiments described above, examples in each of which an image forming apparatus according to an aspect of the present invention is applied to an MFP having at least two functions of a copier function, a printer function, a scanner function, and a facsimile function are described. However, the image forming apparatus is applicable to any image forming apparatus such as a copier, printer, a scanner, or a facsimile.

An embodiment makes it possible, even with a bus architecture having multiple access paths to a memory, to maintain an order of accesses to the memory caused by memory access requests issued by a single master and an order of responses to the requests.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
a storage configured to store image data; and
a processor configured to,
- determine a transfer path via which the image data is to be transferred from among multiple transfer paths connected to the storage,
- select the transfer path via which the image data is to be transferred based on the determined transfer path,
- determine whether the determined transfer path is changed from a transfer path used in most recent transfer of the image data,
- if the processor determines that the determined transfer path is changed from the transfer path used in the most recent transfer of the image data, wait for responses to all of already-issued access requests to the storage and issue a next access request to the storage after waiting for the responses to the all of already-issued access requests to the storage, and
- if the processor determines that the determined transfer path is not changed from the transfer path used in the most recent transfer of the image data, issue a next access request so as to control a difference between a number of already-issued access requests and a number of already-received responses.

2. The image processing apparatus according to claim 1, wherein the processor is configured to determine whether output of the image data transferred to the storage according to the access requests is in progress and, if the processor determines that the output is in progress, determine to use a transfer path granted high priority access to the storage but if the processor determines that the output is not in progress, determine to use a transfer path granted low priority access to the storage.

3. The image processing apparatus according to claim 2, wherein the processor is configured to determine whether scanning of the image data to be transferred from the storage according to the access requests is in progress and, if the processor determines that the scanning is in progress, determine to use the transfer path granted high priority access to the storage but if the processor determines that the scanning is not in progress, determine to use the transfer path granted low priority access to the storage.

4. The image processing apparatus according to claim 1, wherein the processor is configured to,
- add attribute information indicating the determined transfer path to the access request to the storage, and
- select the transfer path based on the attribute information added to access request.

5. The image processing apparatus according to claim 1, wherein
the access requests are configured such that the access requests granted high priority access do not reach the storage earlier than the access requests granted low priority access, and
the processor is configured to issue the next access request to the storage after wailing for the responses, if the processor determines that the already-issued access requests are granted low priority access and the next access request is granted high priority access.

6. The image processing apparatus according to claim 1, wherein the processor is configured to wait for the responses by,
counting the number of the already-issued access requests to the storage, and
counting the number of the already-received responses to the already-issued access requests to the storage.

7. A control method comprising:
determining a transfer path via which image data is to be transferred from among multiple transfer paths connected to a storage that stores the image data;
selecting the transfer path via which the image data is to be transferred based on the determined transfer path;
determining whether the determined transfer path is changed from a transfer path used in most recent transfer of the image data;
if it is determined that the determined transfer path is changed from the transfer path used in the most recent transfer of the image data, waiting for responses to all of already-issued access requests to the storage and issuing a next access request to the storage after waiting for the responses to the all of already-issued access requests to the storage; and
if it is determined that the determined transfer path is not changed from the transfer path used in the most recent transfer of the image data, issuing a next access request so as to control a difference between a number of already-issued access requests and a number of already-received responses.

8. The control method according to claim 7, wherein the waiting for the responses includes:
counting the number of the already-issued access requests to the storage, and
counting the number of the already-received responses to the already-issued access requests to the storage.

9. An image processing apparatus comprising:
a memory and a processor, the memory containing computer readable code that, when executed by the processor, configures the processor to,
- select, from a plurality of transfer paths connected to the memory, a first transfer path to transfer image data to the memory,
- determine whether the selected first transfer path is different from a second transfer path used in a prior transfer of the image data,
- wait for responses to already-issued ones of access requests to the storage, if the processor determines that the first transfer path is different from the second transfer path used in the prior transfer of the image data, and
- issue a next one of the access requests to the memory, after the processor waits for the responses.

10. The image processing apparatus according to claim 9, wherein the memory containing computer readable code configures the processor to wait for the response by,
counting a number of the already-issued ones of the access requests to the storage, and
counting a number of the responses to the already-issued ones of the access requests to the storage.

* * * * *